(12) United States Patent
Hillis et al.

(10) Patent No.: US 8,279,545 B2
(45) Date of Patent: Oct. 2, 2012

(54) HIGH BANDWIDTH DATA TRANSFER TO AND FROM ROTATING DATA STORAGE DEVICES

(75) Inventors: W. Daniel Hillis, Encino, CA (US); Roderick A. Hyde, Redmond, WA (US); Muriel Y. Ishikawa, Livermore, CA (US); Edward K. Y. Jung, Bellevue, WA (US); Nathan P. Myhrvold, Medina, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 7 days.

(21) Appl. No.: 11/799,738

(22) Filed: May 1, 2007

(65) Prior Publication Data
US 2008/0024898 A1 Jan. 31, 2008

Related U.S. Application Data

(63) Continuation-in-part of application No. 11/003,569, filed on Dec. 3, 2004, now Pat. No. 7,230,784.

(51) Int. Cl.
*G11B 5/86* (2006.01)
*G11B 15/12* (2006.01)

(52) U.S. Cl. ............... 360/15; 360/61; 369/84
(58) Field of Classification Search .......... None
See application file for complete search history.

(56) References Cited

U.S. PATENT DOCUMENTS

| | | | |
|---|---|---|---|
| 4,638,378 A * | 1/1987 | Zanessi | 360/15 |
| 4,871,903 A | 10/1989 | Carrell | |
| 4,972,396 A | 11/1990 | Rafner | |
| 4,998,238 A | 3/1991 | Mizunoe et al. | |
| 5,729,408 A | 3/1998 | Kikitsu | |
| 5,886,960 A | 3/1999 | Bos et al. | |
| 6,195,230 B1 | 2/2001 | O'Connor | |
| 6,373,648 B2 | 4/2002 | O'Connor | |
| 6,807,138 B1 | 10/2004 | Jamail et al. | |
| 7,016,132 B2 * | 3/2006 | Sato et al. | 360/31 |
| 2001/0000444 A1 | 4/2001 | O'Connor | |
| 2001/0030924 A1 | 10/2001 | Trezza | |
| 2002/0021630 A1 | 2/2002 | Lee | |
| 2002/0097515 A1 | 7/2002 | Antonio et al. | |
| 2003/0043495 A1 | 3/2003 | Mayer | |

(Continued)

FOREIGN PATENT DOCUMENTS

JP 63018580 A1 1/1988

(Continued)

*Primary Examiner* — Andrew L Sniezek

(57) ABSTRACT

A method of transferring data of one or more rotatable data storage devices includes but is not limited to rotating the at least one rotatable data storage device; transferring the data between a plurality of stationary data transfer heads and the one or more rotatable data storage devices; and using one or more computer programs to determine which of the plurality of stationary data transfer heads are to be used to transfer a first portion of the data between the plurality of stationary data transfer heads and the one or more rotatable data storage devices and the direction in which the first portion of the data is to be transferred. In addition to the foregoing, other method aspects are described in the claims, drawings, and text forming a part of the present application. Other methods and apparatuses are also disclosed.

18 Claims, 18 Drawing Sheets

U.S. PATENT DOCUMENTS

| | | |
|---|---|---|
| 2003/0086196 A1* | 5/2003 | Morris et al. .................. 360/75 |
| 2003/0126158 A1 | 7/2003 | Chainer et al. |
| 2003/0161245 A1 | 8/2003 | Henrichs |
| 2003/0235140 A1 | 12/2003 | Holmberg et al. |
| 2004/0130815 A1 | 7/2004 | Barnes |
| 2004/0175157 A1 | 9/2004 | Johnson |
| 2006/0072241 A1 | 4/2006 | Feliss et al. |

FOREIGN PATENT DOCUMENTS

| | | |
|---|---|---|
| JP | 03178076 A1 | 8/1991 |
| JP | 04060964 A1 | 2/1992 |
| JP | 06176377 A1 | 6/1994 |
| JP | 06236664 A1 | 8/1994 |
| JP | 09219003 A1 | 8/1997 |

* cited by examiner

US 8,279,545 B2

HIGH BANDWIDTH DATA TRANSFER TO AND FROM ROTATING DATA STORAGE DEVICES

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of U.S. patent application Ser. No. 11/003,569, entitled High Bandwidth Data Transfer to and from Rotating Data Storage Devices, naming W. Daniel Hillis; Roderick A. Hyde; Muriel Y. Ishikawa; Edward K. Y. Jung; Nathan P. Myhrvold; and Lowell L. Wood, Jr. as inventors, filed Dec. 3, 2004 now U.S. Pat. No. 7,230,784, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related application and of any and all parent, grandparent, great-grandparent, etc. applications of the Related applications is incorporated herein by reference to the extent such subject matter is not inconsistent herewith.

TECHNICAL FIELD

The present application relates, in general, to high bandwidth data transfer to and from rotating data storage devices.

SUMMARY

In one aspect, a method of transferring data of at least one rotatable data storage device includes but is not limited to rotating the at least one rotatable data storage device; transferring the data between a plurality of stationary data transfer heads and the at least one rotatable data storage device; and using one or more computer program to determine which of the plurality of stationary data transfer heads are to be used to transfer a first portion of the data between the plurality of stationary data transfer heads and the at least one rotatable data storage device and the direction in which the first portion of the data is to be transferred. In addition to the foregoing, other method aspects are described in the claims, drawings, and text forming a part of the present application.

In another aspect, a rotatable data storage device assembly includes but is not limited to at least one rotatable data storage device; a plurality of stationary data transfer heads; and at least one computer program to determine which of the plurality of stationary data transfer heads are to be used to transfer a first portion of the data between the plurality of stationary data transfer heads and the at least one rotatable data storage device and the direction in which the first portion of the data is to be transferred. In addition to the foregoing, other container aspects are described in the claims, drawings, and text forming a part of the present application.

In another aspect, a system of transferring data of at least one rotatable data storage device includes but is not limited to at least one rotatable data storage device; a plurality of stationary data transfer heads; and circuitry for transferring data between the at least one rotatable data storage device and the plurality of stationary data transfer heads; and circuitry for determining which of the plurality of stationary data transfer heads are to be used to transfer a first portion of the data between the plurality of stationary data transfer heads and the at least one rotatable data storage devices and the direction in which the first portion of the data is to be transferred. In addition to the foregoing, other system aspects are described in the claims, drawings, and text forming a part of the present application.

In another aspect, a system includes but is not limited to means for rotating at least one rotatable data storage device; means for transferring data between a plurality of stationary data transfer heads and the at least one rotatable data storage device; and means for determining which of the plurality of stationary data transfer heads are to be used to transfer a first portion of the data between the plurality of stationary data transfer heads and the at least one rotatable data storage device and the direction in which the first portion of the data is to be transferred. In addition to the foregoing, other method aspects are described in the claims, drawings, and text forming a part of the present application.

In one or more various aspects, related systems include but are not limited to circuitry and/or programming and/or electromechanical devices and/or optical devices for effecting the herein-referenced method aspects; the circuitry and/or programming and/or electromechanical devices and/or optical devices can be virtually any combination of hardware, software, and/or firmware configured to effect the herein-referenced method aspects depending upon the design choices of the system designer skilled in the art.

In addition to the foregoing, various other method and/or system aspects are set forth and described in the text (e.g., claims and/or detailed description) and/or drawings of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the detailed description set forth herein.

DETAILED DESCRIPTION

Following are a series of flowcharts depicting implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations.

Figure 1:
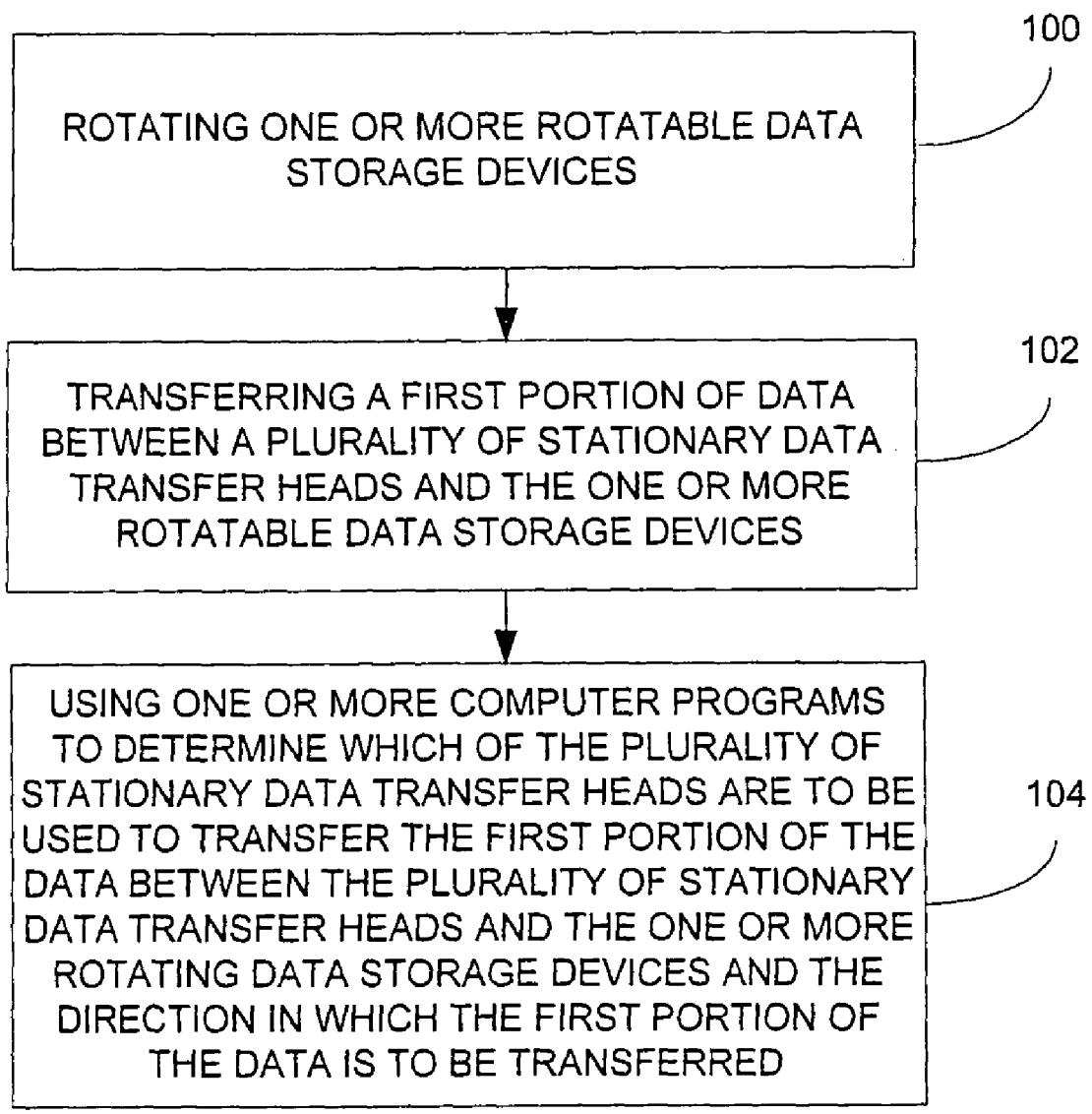
FIG. 1 is a flowchart depicting an embodiment of the subject matter of the present application.

With reference now to FIG. 1, shown is an example of a method for transferring data of one or more rotatable data storage devices is shown. The method includes rotating the one or more rotatable data storage devices (step 100); transferring the data between a plurality of stationary data transfer heads and the one or more rotatable data storage devices (step 102); and using one or more computer programs to determine which of the plurality of stationary data transfer heads are to be used to transfer a first portion of the data between the plurality of stationary data transfer heads and the one or more rotatable data storage devices and the direction in which the first portion of the data is to be transferred (step 104).

Figure 2:
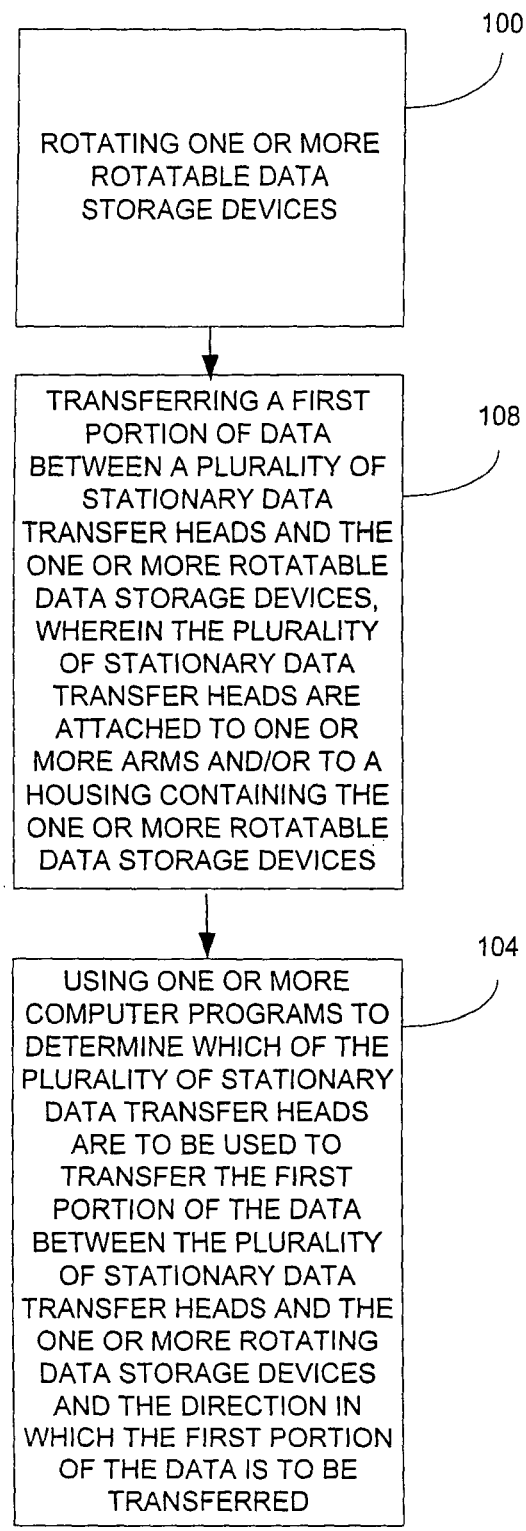
FIG. 2 is a flowchart depicting another embodiment of the subject matter of the present application.

FIG. 2 illustrates an embodiment, a method for transferring data of one or more rotatable data storage devices is shown. The method includes step 100 and step 104, and in addition, transferring a first portion of data between a plurality of stationary data transfer heads and the one or more rotatable data storage devices, wherein the plurality of stationary data transfer heads are attached to one or more arms and/or to a housing containing the one or more rotatable data storage devices (step 108).

Figure 3:
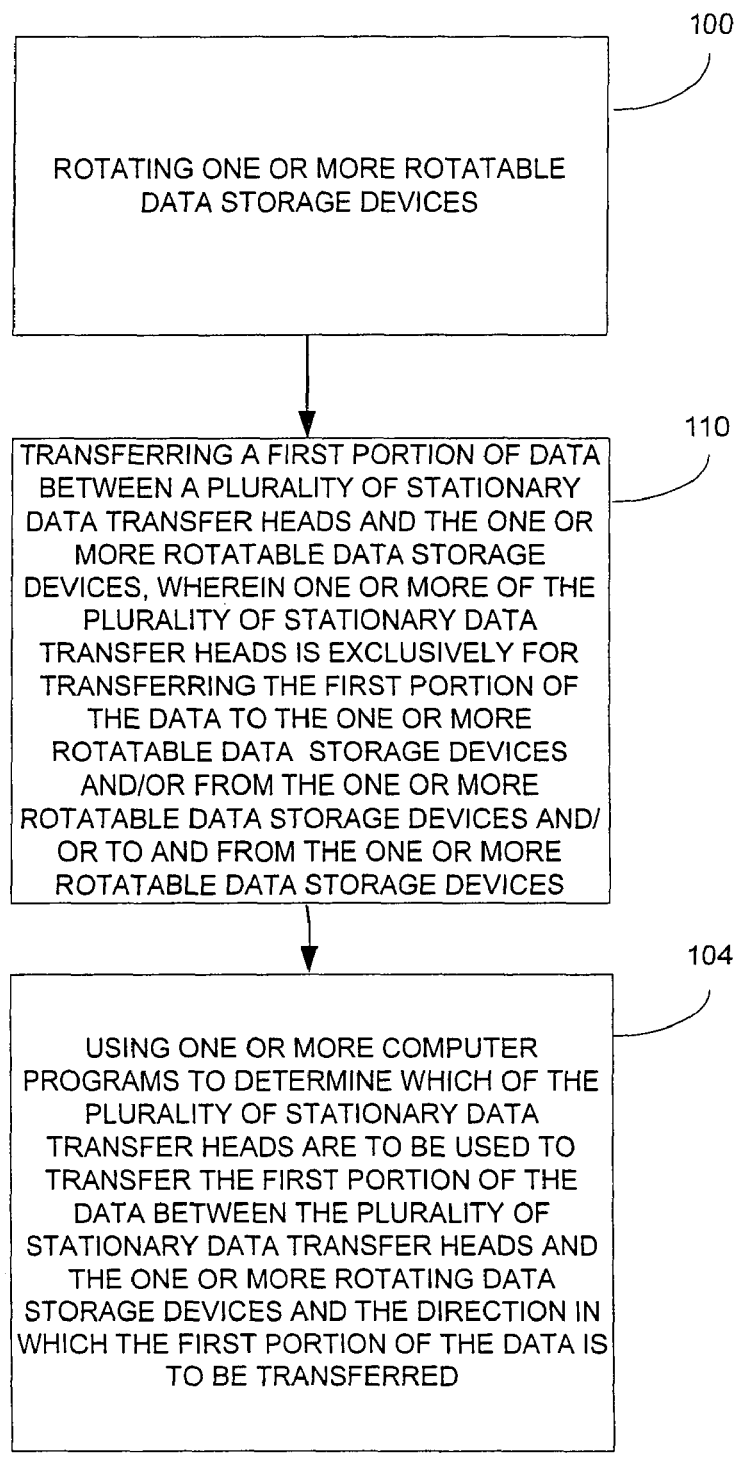
FIG. 3 is a flowchart depicting another embodiment.

In FIG. 3, an embodiment is depicted. The embodiment is a method for transferring data of one or more rotatable data storage devices and includes step 100 and step 104, and, in addition, transferring a first portion of data between a plurality of stationary data transfer heads and the one or more rotatable data storage devices wherein one or more of the plurality of stationary data transfer heads is exclusively for transferring a first portion of the data to the one or more rotatable data storage devices and/or from the one or more rotatable data storage devices and/or to and from the one or more rotatable data storage device (step 110).

Figure 4:
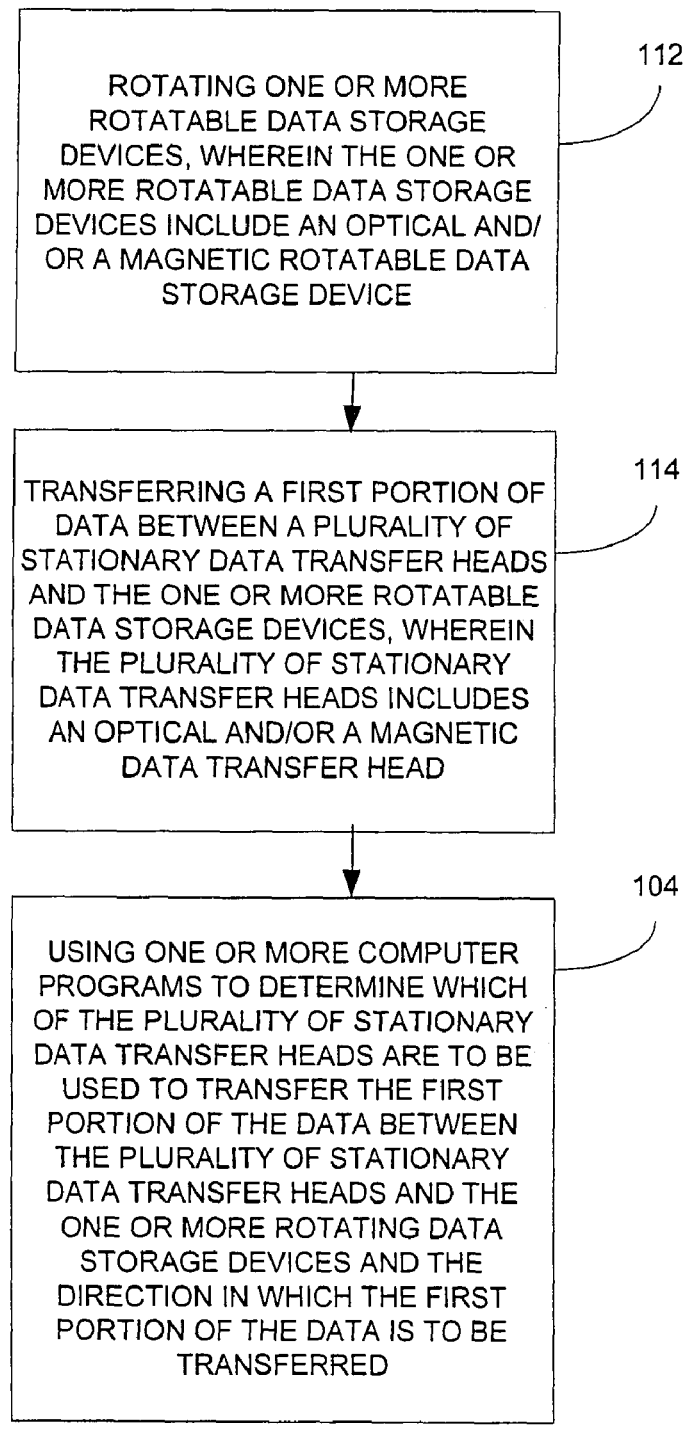
FIG. 4 is a flowchart depicting another embodiment.

An embodiment is illustrated in FIG. 4. The embodiment is a method for transferring data of one or more rotatable data storage devices and includes step 104, and, in addition, rotating the one or more rotatable data storage devices, wherein the one or more of the one or more rotatable data storage devices include an optical rotatable data storage device and/or a magnetic rotatable data storage device (step 112); and transferring a first portion of data between a plurality of stationary data transfer heads and the one or more rotatable data storage devices, wherein the plurality of stationary data transfer heads includes an optical data transfer head and/or a magnetic data transfer head (step 114).

Figure 5:
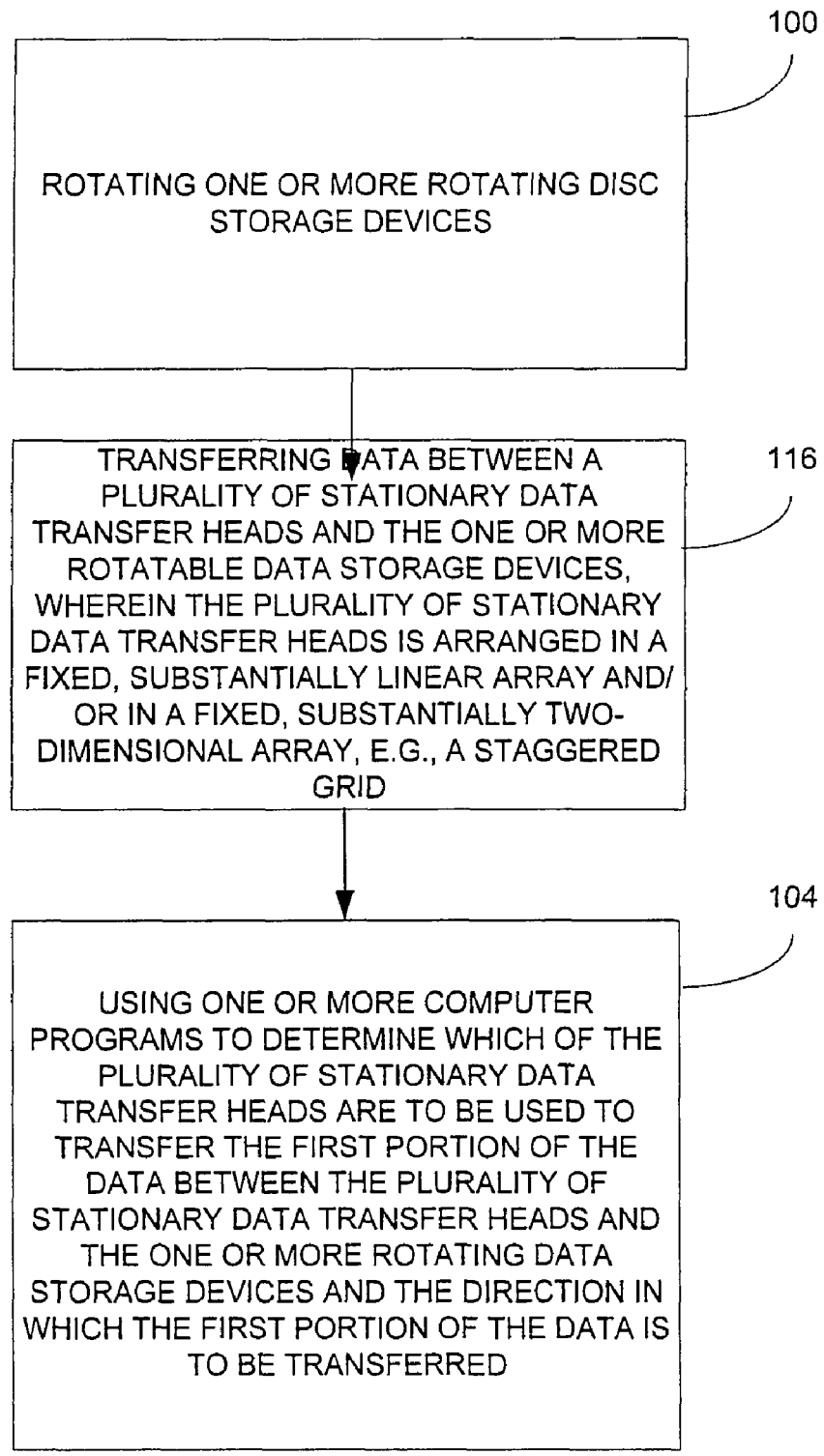
FIG. 5 is a flowchart depicting another embodiment.

An embodiment shown in FIG. 5 is a method for transferring data of one or more rotatable data storage devices. The method includes step 100 and step 104, and, in addition, transferring data between a plurality of stationary data transfer heads and the one or more rotatable data storage devices, wherein the plurality of data transfer heads is arranged in a fixed, substantially linear array and/or in a fixed, substantially two-dimensional array, e.g., a staggered grid (step 116).

Figure 6:
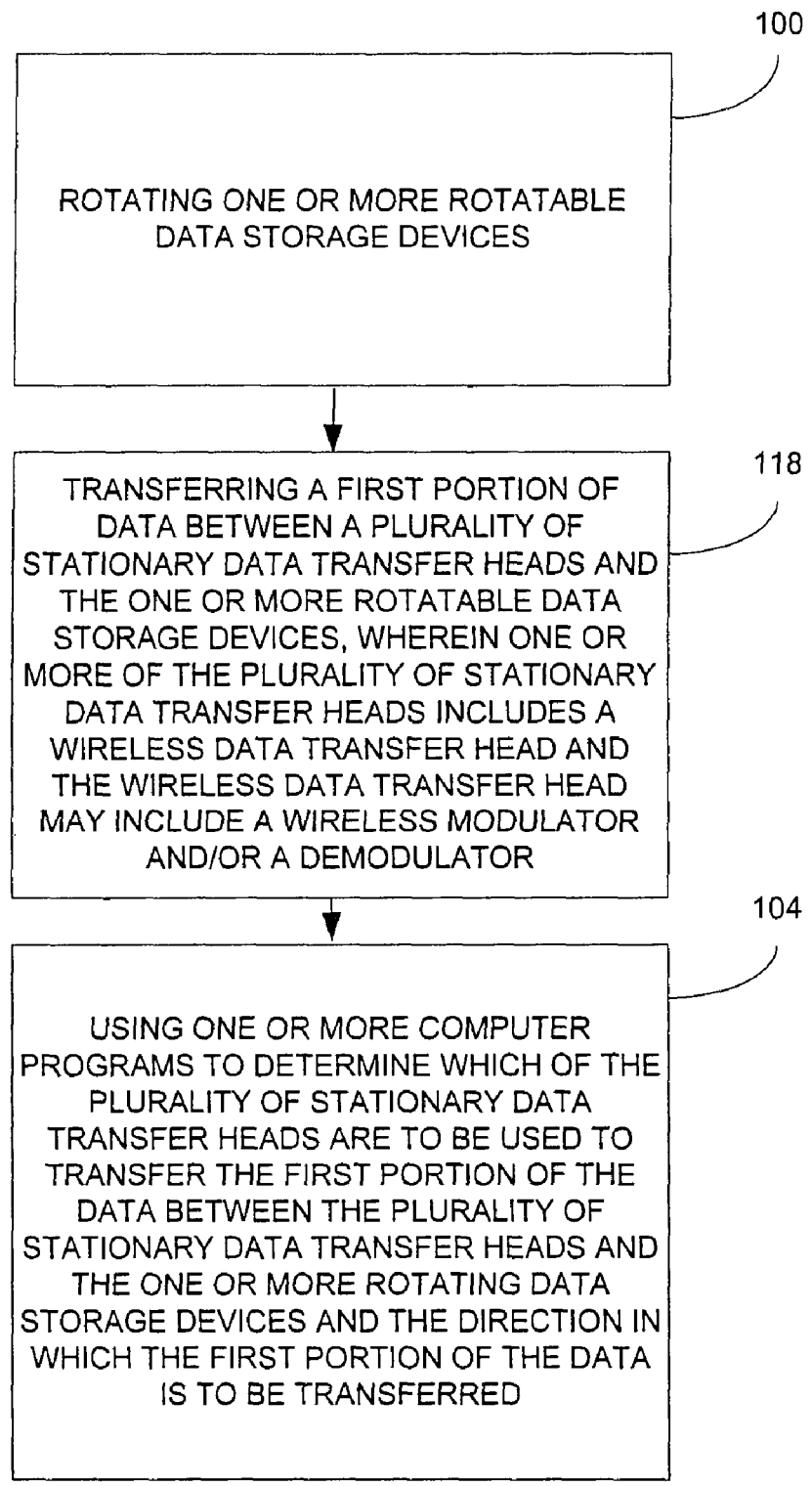
FIG. 6 is a flowchart depicting another embodiment.

FIG. 6 depicts an embodiment, a method for transferring data of one or more rotatable data storage devices which includes step 100 and step 104, and, in addition, transferring a first portion of data between a plurality of stationary data transfer heads and the one or more rotatable data storage devices, wherein one or more of the plurality of stationary data transfer heads includes a wireless data transfer head and the wireless data transfer head may include a wireless modulator and/or a demodulator (step 118).

Figure 7:
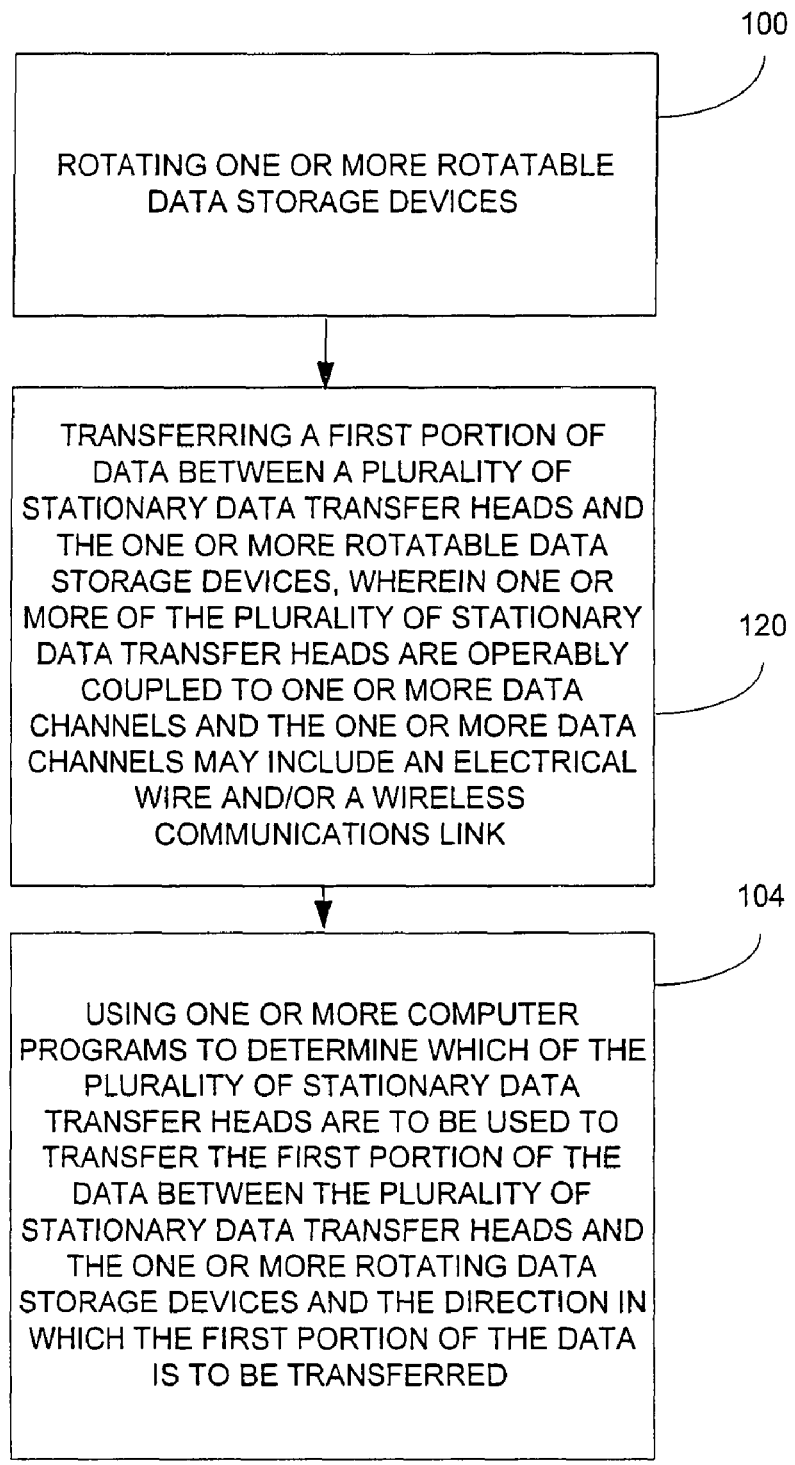
FIG. 7 is a flowchart depicting another embodiment.

An embodiment illustrated in FIG. 7 is a method for transferring data of one or more rotatable data storage devices which includes step 100 and step 104, and, in addition, transferring a first portion of data between a plurality of stationary data transfer heads and the one or more rotatable data storage devices, wherein one or more of the plurality of stationary data transfer heads are operably coupled to one or more data channels and the one or more data channels may include an electrical wire and/or a wireless communications link (step 120).

Figure 8:
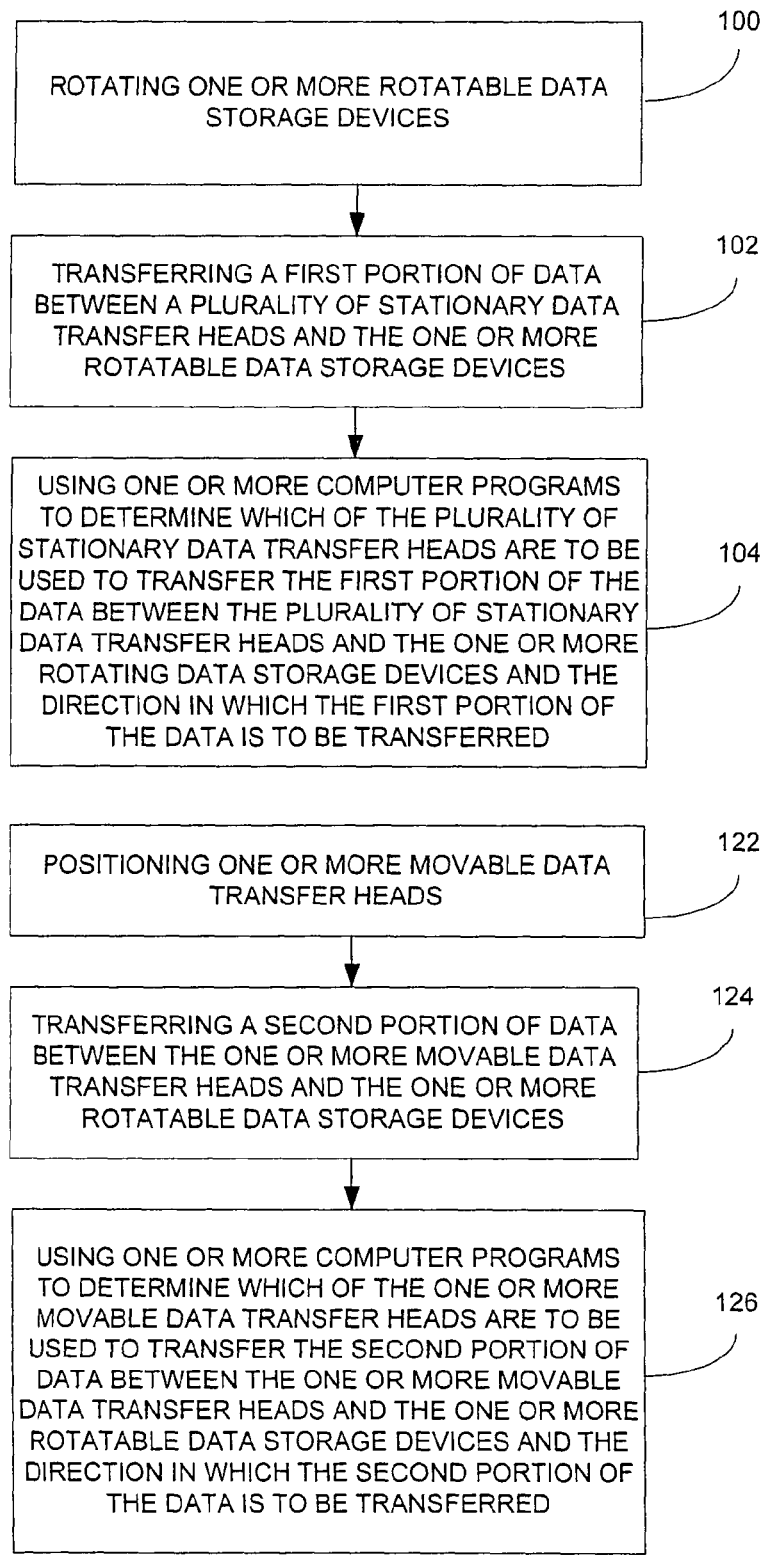
FIG. 8 is a flowchart depicting another embodiment.

FIG. 8 shows an embodiment, a method for transferring data of one or more rotatable data storage devices. The depicted embodiment includes steps 100, 102 and 104, and, in addition, positioning one or more movable data transfer heads (step 122); transferring a second portion of data between the one or more movable data transfer heads and the one or more rotatable data storage devices (step 124); and using one or more computer programs to determine which of the one or more movable data transfer heads are to be used to transfer the second portion of data between the one or more movable data transfer heads and the one or more rotatable data storage devices and the direction in which the second portion of the data is to be transferred (step 126).

Figure 9:
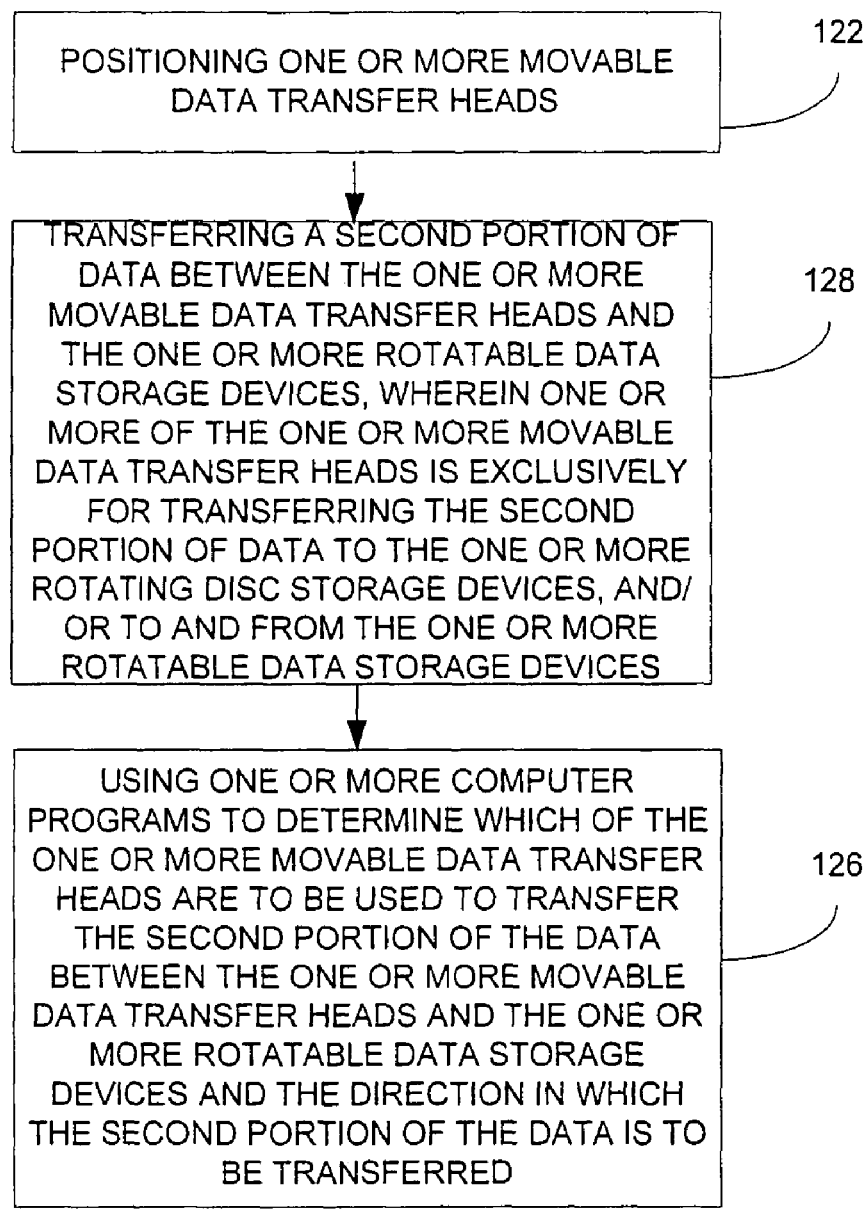
FIG. 9 is a flowchart depicting another embodiment.

Shown in FIG. 9 is an embodiment, a method for transferring data of one or more rotatable data storage devices which includes step 122 and step 126, and, in addition, transferring a second portion of data between the one or more movable data transfer heads and the one or more rotatable data storage devices wherein one or more of the one or more movable data transfer heads is exclusively for transferring the second portion of the data to the one or more rotatable data storage devices, and/or to and from the one or more one rotatable data storage devices (step 128).

Figure 10:
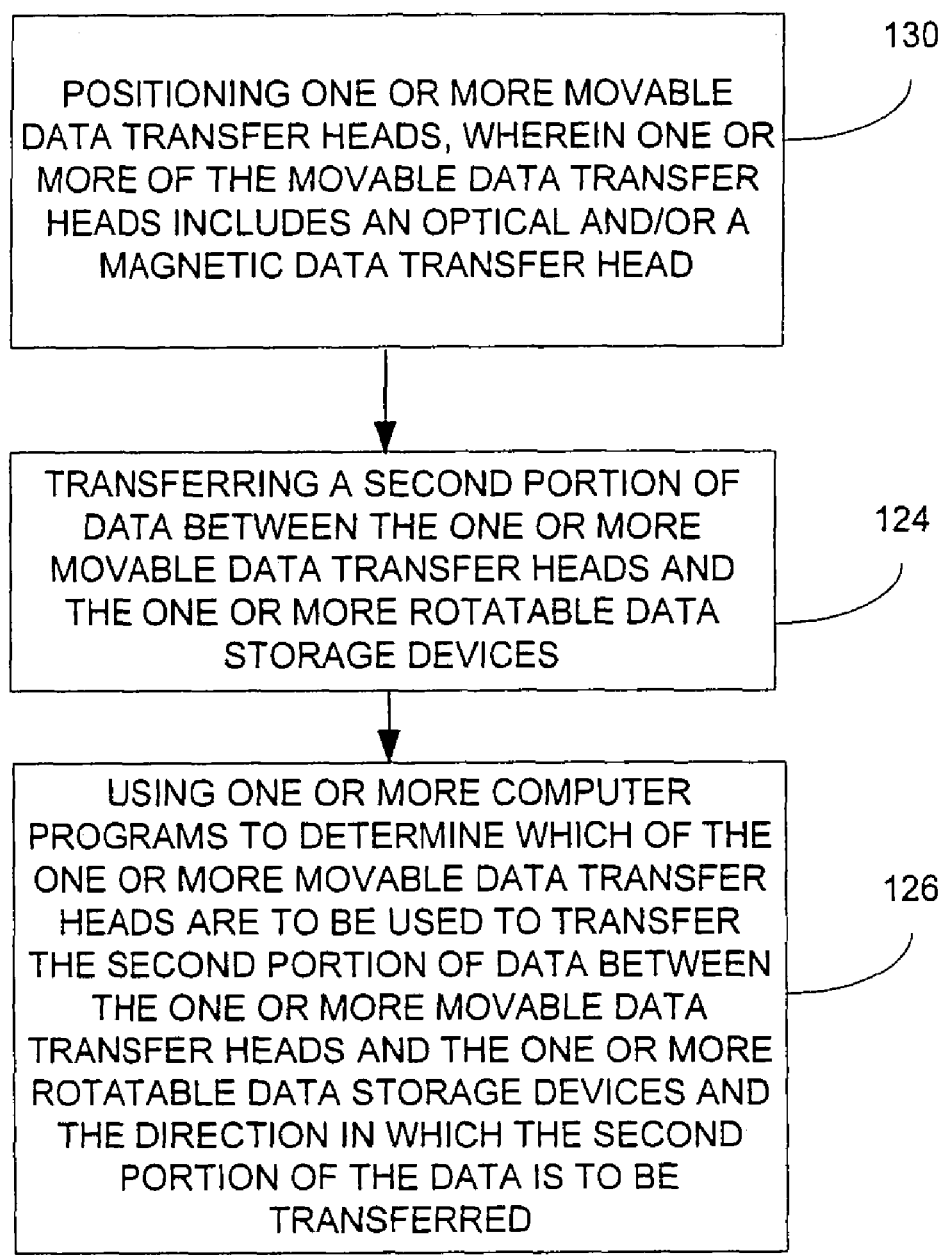
FIG. 10 is a flowchart depicting another embodiment.

An embodiment illustrated in FIG. 10 is a method for transferring data of one or more rotatable data storage devices which includes step 124 and step 126, and, in addition, positioning one or more movable data transfer heads, wherein one or more of the one or more movable data transfer heads includes an optical data transfer head and/or a magnetic data transfer head (step 130).

Figure 11:
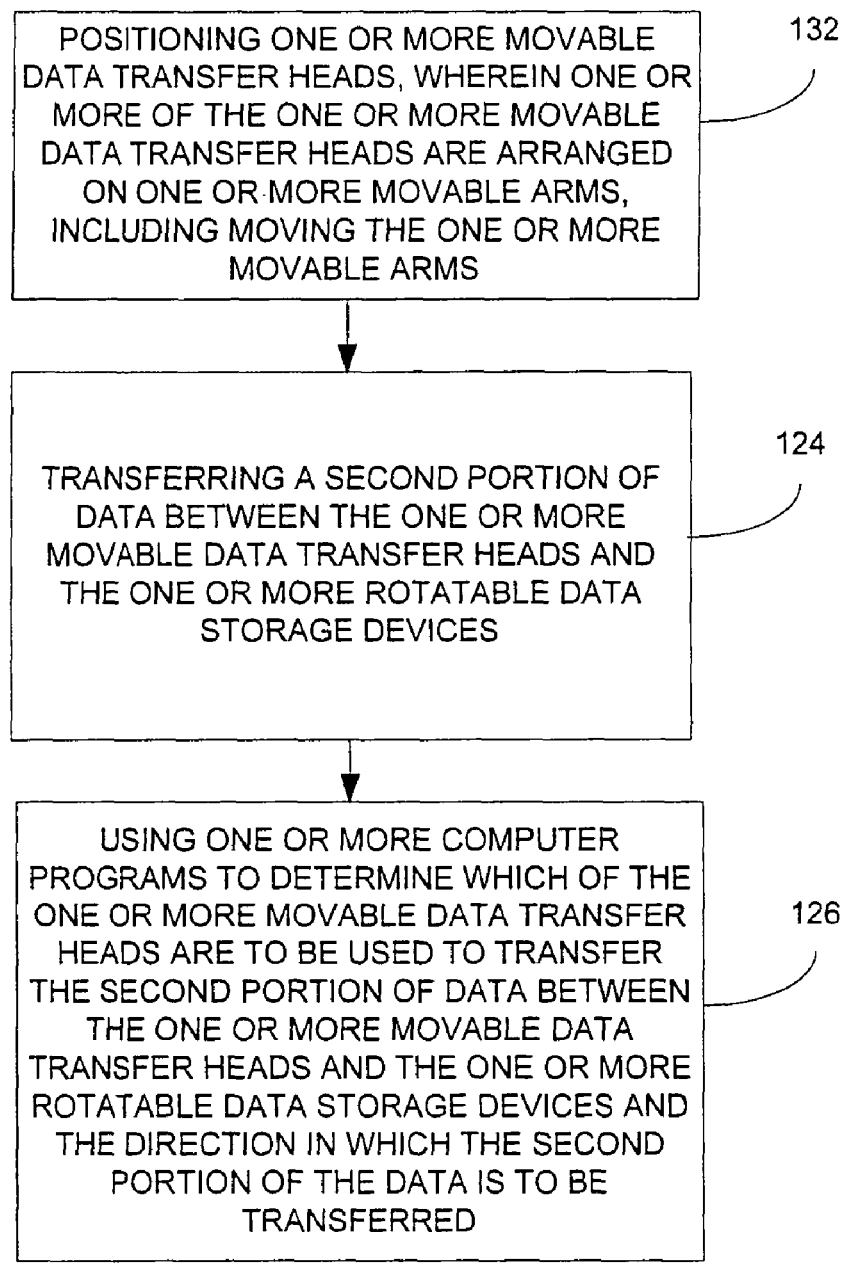
FIG. 11 is a flowchart depicting another embodiment.

FIG. 11 shows an embodiment, a method for transferring data of one or more rotatable data storage devices which includes step 124 and step 126, and, in addition, positioning one or more movable data transfer heads, wherein the one or more movable data transfer heads are arranged on one or more movable arms, including moving the one or more movable arms (step 132).

Figure 12:
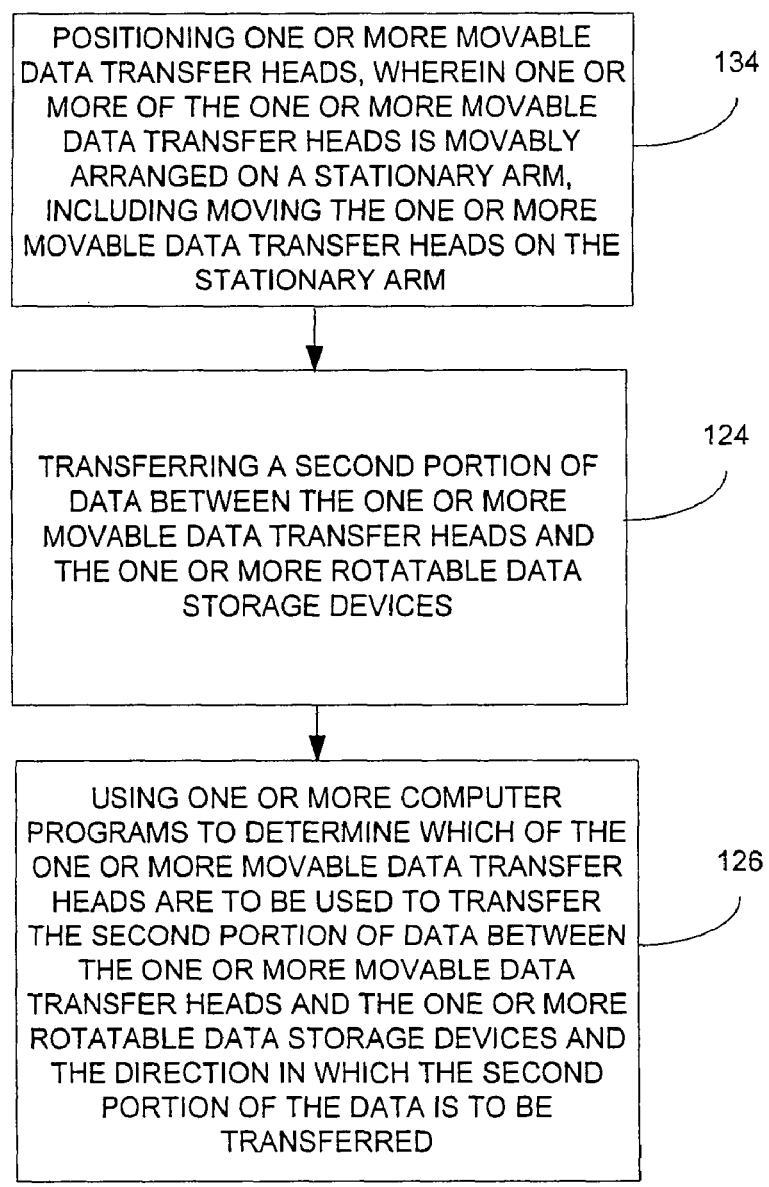
FIG. 12 is a flowchart depicting another embodiment.

FIG. 12 shows an embodiment, a method for transferring data of one or more rotatable data storage devices which includes step 124 and step 126, and in addition, positioning one or more movable data transfer heads, wherein one or more of the one or more movable data transfer heads is movably arranged on a stationary arm, including moving the one or more movable data transfer heads on the stationary arm (step 134).

Figure 13:
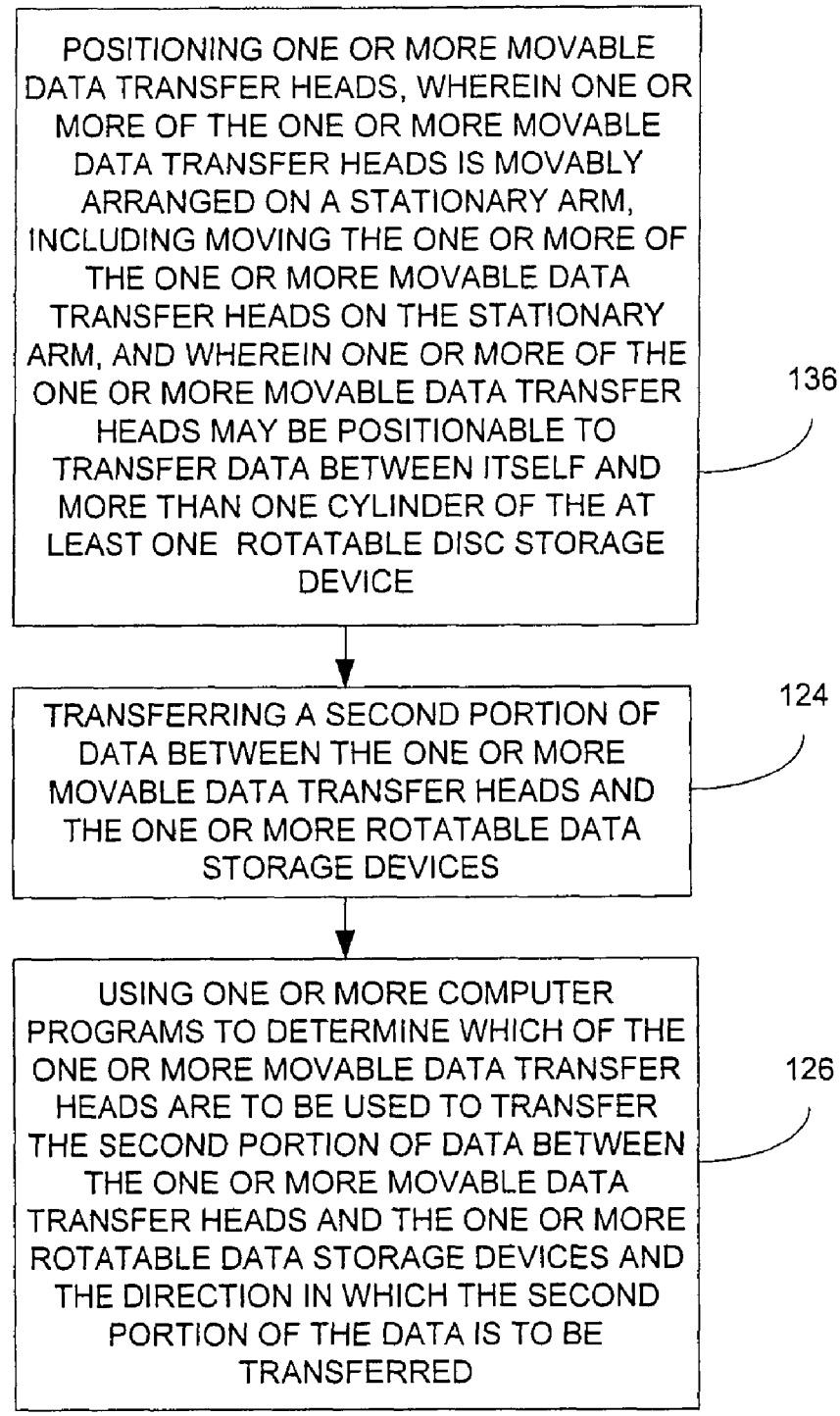
FIG. 13 is a flowchart depicting another embodiment.

FIG. 13 depicts an embodiment, a method for transferring data of one or more rotatable data storage devices, which includes step 124 and step 126, and, in addition, positioning one or more movable data transfer heads, wherein one or more of the one or more movable data transfer heads is movably arranged on a stationary arm, including moving the one or more of the one or more movable data transfer heads on the stationary arm, and wherein the one or more of the one or more movable data transfer heads may be positionable to transfer data between itself and more than one cylinder of the at least one rotatable data storage device (step 136).

Figure 14:
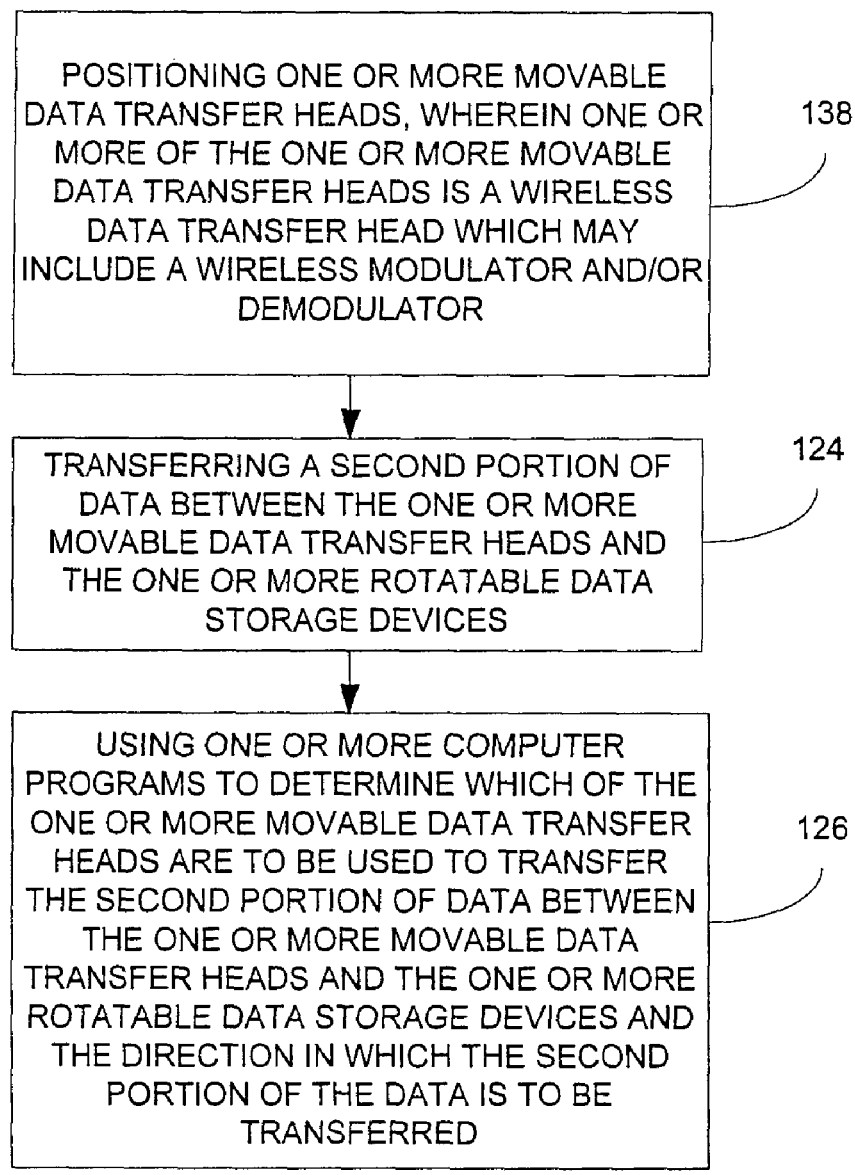
FIG. 14 is a flowchart depicting another embodiment.

In FIG. 14, an embodiment, a method for transferring data of one or more rotatable data storage devices, which includes step 124 and step 126, and in addition, positioning one or more movable data transfer heads, wherein one or more of the one or more movable data transfer heads is a wireless data transfer head which may include a wireless modulator and/or demodulator (step 138).

Figure 15:
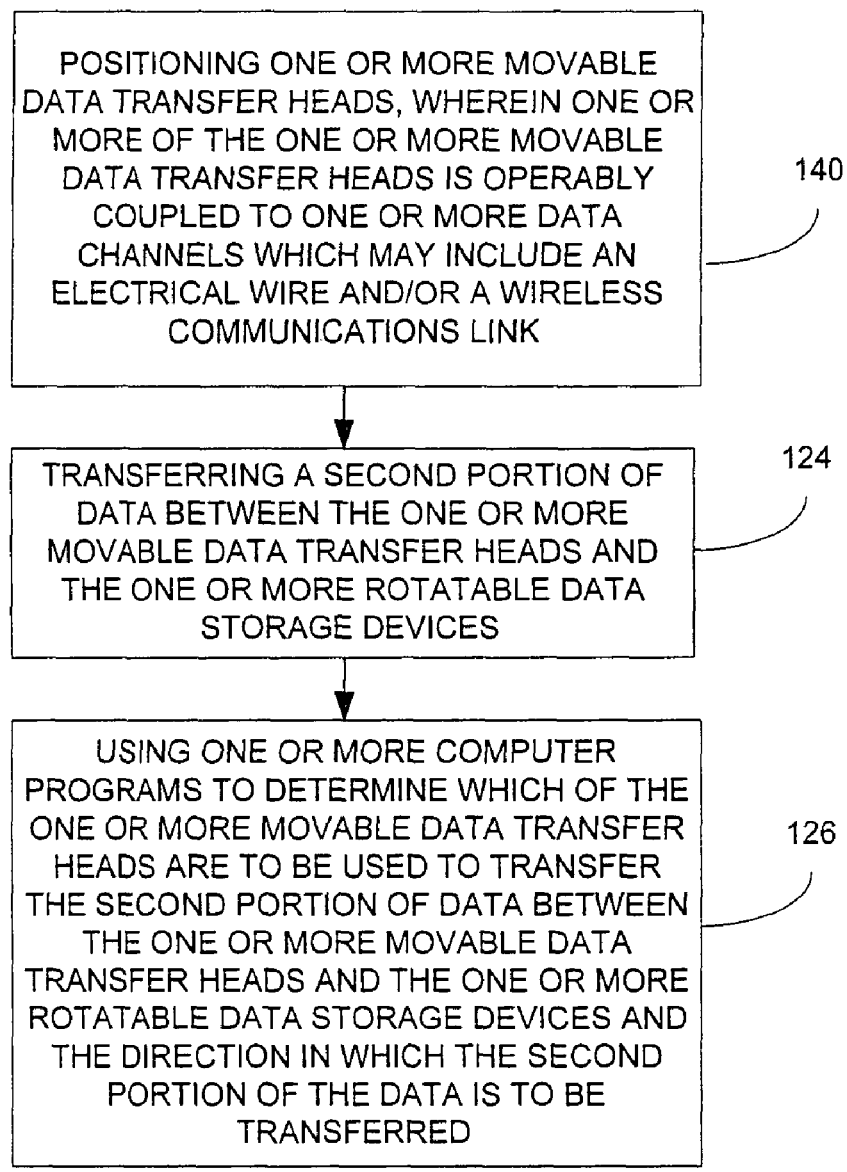
FIG. 15 is a flowchart depicting another embodiment.

FIG. 15 shows an embodiment, a method for transferring data of one or more rotatable data storage devices. This embodiment includes step 124 and step 126, and, in addition, positioning one or more movable data transfer heads, wherein the one or more movable data transfer heads are operably coupled to one or more one data channels which may include an electrical wire and/or a wireless communications link (step 140).

Figure 16:
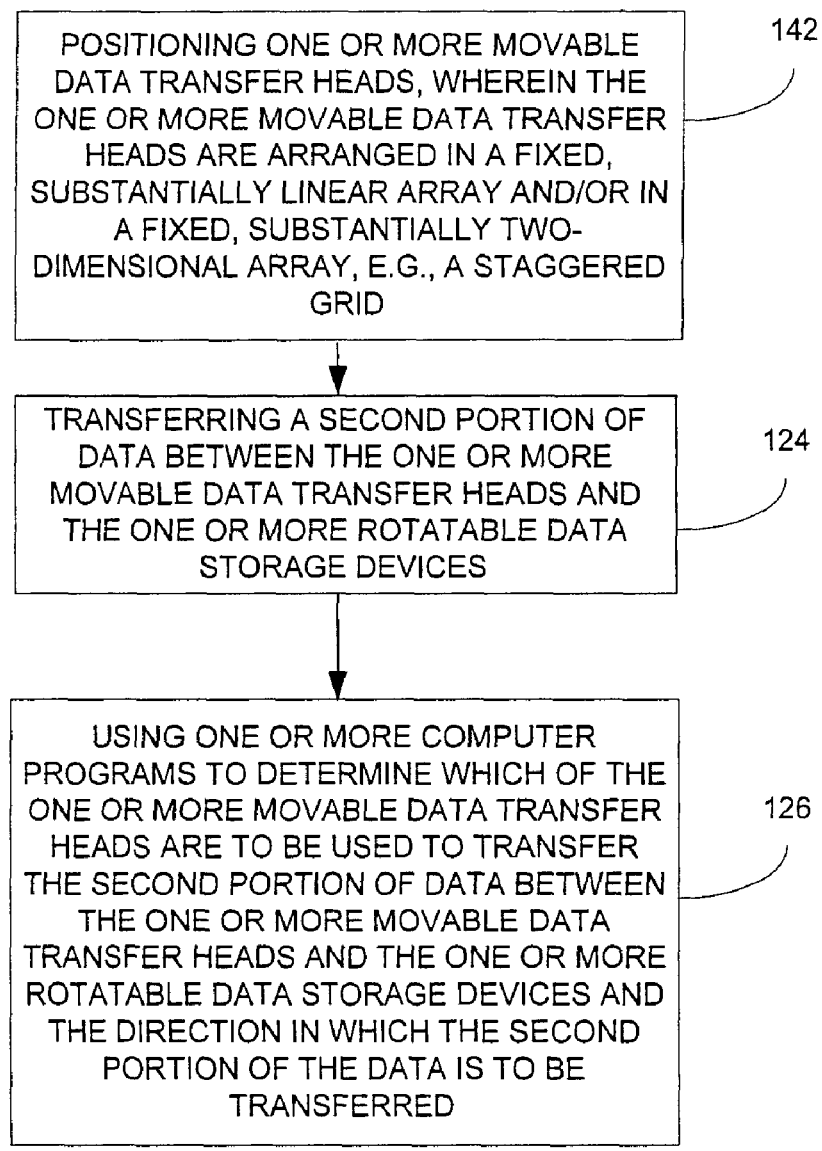
FIG. 16 is a flowchart depicting another embodiment.

An embodiment shown in FIG. 16, a method for transferring data of one or more rotatable data storage devices, includes step 124 and step 126, and, in addition, positioning one or more movable data transfer heads, wherein the one or more movable data transfer heads are arranged in a fixed, substantially linear array and/or in a fixed, substantially two-dimensional array, e.g., a staggered grid (step 142).

Figure 17:
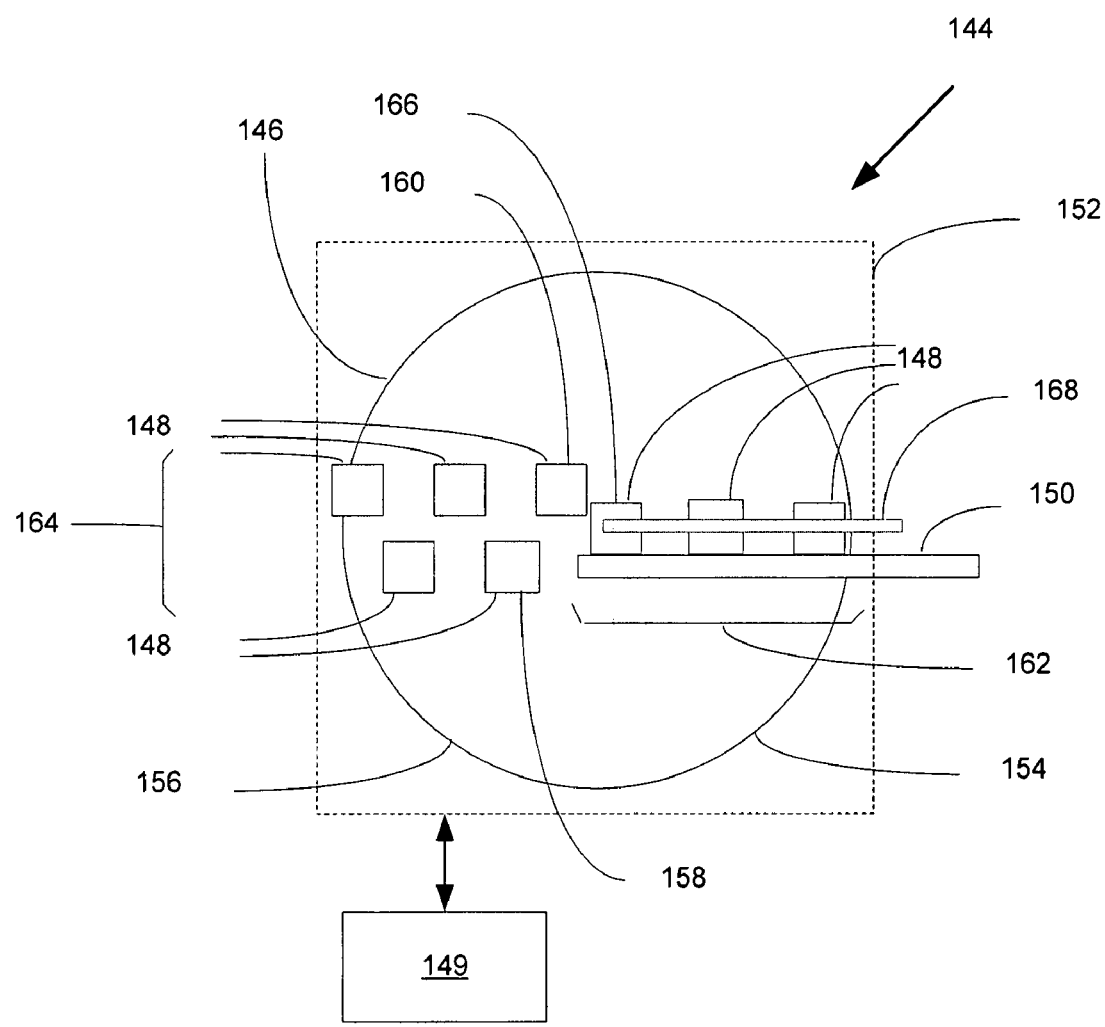
FIG. 17 is a block diagram depicting another embodiment.

FIG. 17 shows an embodiment, a rotatable data storage device assembly 144 that includes one or more rotatable data storage devices 146, a plurality of stationary data transfer heads 148, one or more computer programs 149 to determine which of the plurality of stationary data transfer heads are to be used to transfer a first portion of data between the plurality of stationary data transfer heads and the at least one rotatable data storage device and the direction in which the first portion of the data is to be transferred. The view shown is from above the rotatable data storage device assembly 144. The plurality of stationary data transfer heads 148 may be attached to at least one arm 150 or to a housing 152 that contains the one or more rotatable data storage devices 146. One or more of the plurality of stationary data transfer heads 148 may be exclusively for transferring the first portion of the data to one or more rotatable data storage devices 146 and/or from the one or more rotatable data storage devices 146 and/or to and from the one or more rotatable data storage devices 146. The one or more rotatable data storage devices 146 may include an optical rotatable data storage device 154 and/or a magnetic rotatable data storage device 156. The plurality of stationary data transfer heads 148 may include an optical data transfer head 158 and/or a magnetic data transfer head 160. The plurality of stationary data transfer heads 148 may be arranged in a fixed, substantially linear array 162 and/or in a fixed, substantially two-dimensional array 164, e.g., a staggered grid. The plurality of stationary data transfer heads 148 may include a wireless data transfer head 166 and may include, e.g. a wireless modulator and/or demodulator. The plurality of stationary data transfer heads 148 may be operably coupled to at least one data channel 168, e.g., a data channel including an electrical wire and/or a wireless communications link.

Figure 18:
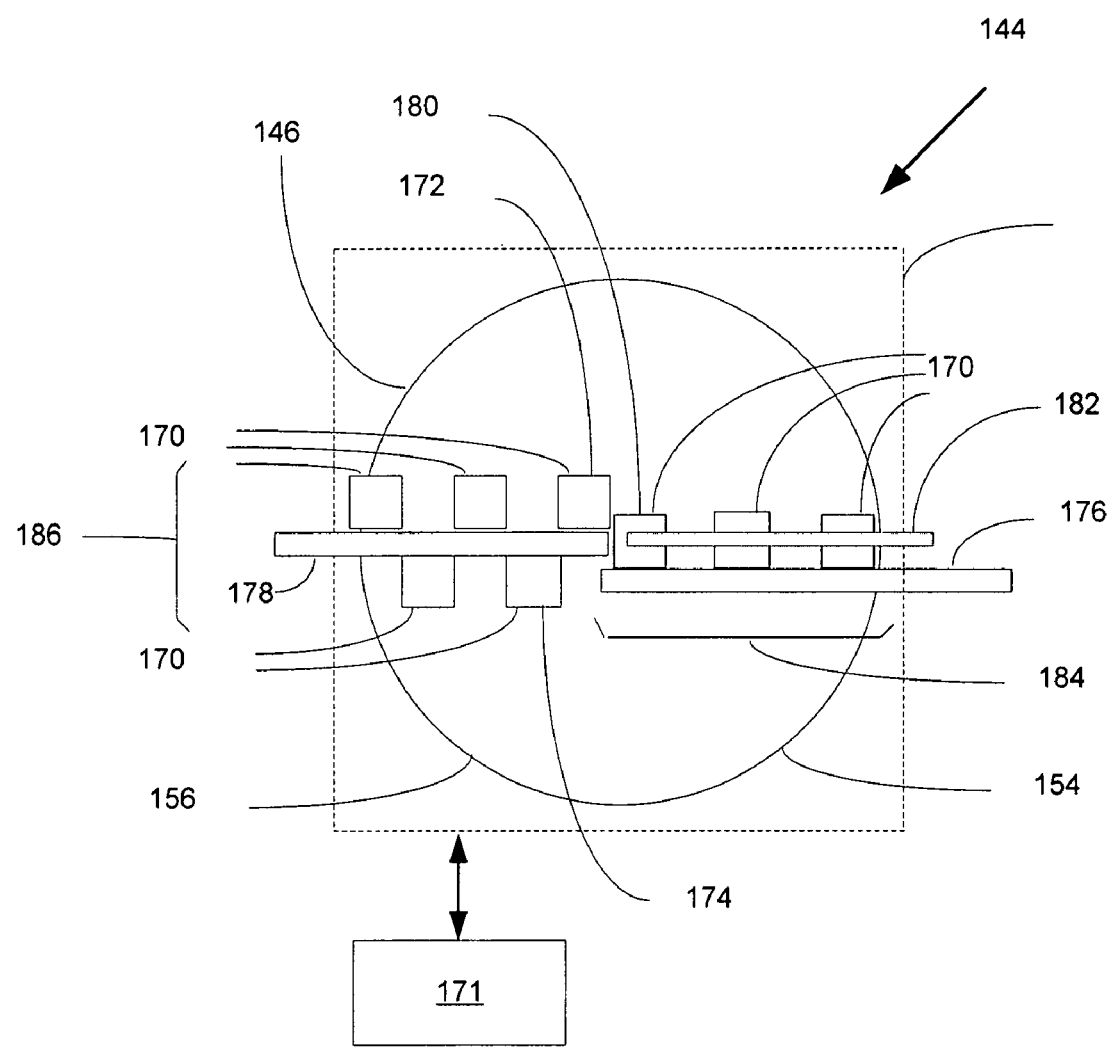
FIG. 18 is a block diagram depicting another embodiment.
The use of the same symbols in different drawings typically indicates similar or identical items.

FIG. 18 shows an embodiment, a rotatable data storage device assembly 144 that includes one or more rotatable data storage devices 146 and a plurality of stationary data transfer heads 148, and in addition, one or more movable data transfer heads 170 and one or more computer programs 171 to determine which of the at least one movable data transfer heads are to be used to transfer a second portion of the data between the at least one movable data transfer heads and the at least one rotatable data storage device and the direction in which the second portion of the data is to be transferred. The view shown is from above the rotatable data storage device assembly 144. One or more of the one or more movable data transfer beads 170 is exclusively for transferring the second portion of the data to the one or more rotatable data storage devices 146 and/or to and from the one or more rotatable data storage devices 146. The one or more movable data transfer heads 170 may include an optical data transfer head 172 and/or a magnetic data transfer head 174. The one or more movable data transfer heads 170 may be arranged on one or more movable arms 176. One or more of the one or more movable data transfer heads 170 may be arranged on a stationary arm 178, and such a movable data transfer head 170 may be positionable to transfer data between itself and more than one cylinder of the one or more rotatable data storage devices 146. The one or more movable data transfer heads 170 may include a wireless data transfer head 180 and may include, e.g. a wireless modulator and/or demodulator. The one or more movable data transfer heads 170 may be operably coupled to at least one data channel 182, e.g., a data channel including an electrical wire and/or a wireless communications link. The one or more movable data transfer heads 170 may be arranged in a fixed, substantially linear array 184 and/or in a fixed, substantially two-dimensional array 186, e.g., a staggered grid.

Steps 100, 102, 104, 108, 110, 112, 114, 116, 118, 120, 122, 124, 126, 128, 130, 132, 134, 136, 138, 140 and 142 as described above may be performed with, e.g., the rotatable data storage device assembly 144 described above.

One skilled in the art will recognize that the foregoing components (e.g., steps, devices, and objects) in FIGS. 1-18 and the discussion accompanying them are used as examples for the sake of conceptual clarity and that various configuration modifications are common. Consequently, as used herein, the specific exemplars set forth in FIGS. 1-18 and the accompanying discussion are intended to be representative of their more general classes. In general, use of any specific exemplar herein is also intended to be representative of its class, and the non-inclusion of such specific components (e.g., steps, devices, and objects) herein should not be taken as indicating that limitation is desired.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various embodiments described herein can be implemented, individually and/or collectively, by various types of electromechanical systems having a wide range of electrical components such as hardware, software, firmware, or virtually any combination thereof; and a wide range of components that may impart mechanical force or motion such as rigid bodies; spring or torsional bodies, hydraulics, and electro-magnetically actuated devices, or virtually any combination thereof. Consequently, as used herein "electro-mechanical system" includes, but is not limited to, electrical circuitry operably coupled with a transducer (e.g., an actuator, a motor, a piezoelectric crystal, etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), electrical circuitry forming a communications device (e.g., a modem, communications switch, or optical-electrical equipment), and any non-electrical analog thereto, such as optical or other analogs. Those skilled in the art will also appreciate that examples of electromechanical systems include but are not limited to a variety of consumer electronics systems, as well as other systems such as motorized transport systems, factory automation systems, security systems, and communication/computing systems. Those skilled in the art will recognize that electromechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into image processing systems. That is, at least a portion of the devices and/or processes described herein can be integrated into an image processing system via a reasonable amount of experimentation. Those having skill in the art will recognize that a typical image processing system generally includes one or more of a system unit housing, a video display device, a memory such as volatile and non-volatile memory, processors such as microprocessors and digital signal processors, computational entities such as operating systems, drivers, and applications programs, one or more interaction devices, such as a touch pad or screen, control systems including feedback loops and control motors (e.g., feedback for sensing lens position and/or velocity; control motors for moving/distorting lenses to give desired focuses. A typical image processing system may be implemented utilizing any suitable commercially available components, such as those typically found in digital still systems and/or digital motion systems.

Those skilled in the art will recognize that it is common within the art to describe devices and/or processes in the fashion set forth herein, and thereafter use standard engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/ communication and/or network computing/communication systems.

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote computing/communication systems, combined with standard engineering practices. Specific examples of such components entail such as Intel Corporation's mote components and supporting hardware, software, and firmware as well as the Defense Advanced Research Project's (DARPA's) network embedded sensor technologies.

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components.

While particular aspects of the present subject matter described herein have been shown and described, it will be apparent to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

Other embodiments are within the following claims.

We claim:

1. A system comprising:
    means for reading a first portion of data from a sourcing-data medium as a function of an induced relative movement between at least two stationary sourcing-data-medium transfer heads and the sourcing data medium, the at least two stationary sourcing-data-medium transfer heads defining one or more arrays of sourcing-data-medium transfer heads;
    means for writing the first portion of data read from the sourcing data medium to at least one sinking data medium as a function of an induced relative movement between at least two stationary sinking-data-medium transfer heads and the at least one sinking data medium, the at least two stationary sinking-data-medium transfer heads defining one or more arrays of stationary sinking-data-medium transfer heads;
    means for reading a second portion of data from the sourcing-data medium as a function of an induced relative movement between at least two movable sourcing-data-medium transfer heads and the sourcing data medium, the at least two movable sourcing-data-medium transfer heads defining one or more arrays of movable sourcing-data-medium transfer heads; and
    means for writing the second portion of data read from the sourcing data medium to the at least one sinking data medium as a function of an induced relative movement between at least two movable sinking-data-medium transfer heads and the at least one sinking data medium, the at least two movable sinking-data-medium transfer heads defining one or more arrays of movable sinking-data-medium transfer heads.

2. The system of claim 1, wherein at least one of said means for reading a first portion of data from a sourcing-data medium as a function of an induced relative movement between at least two stationary sourcing-data-medium transfer heads and the sourcing-data medium or said means for reading a second portion of data from the sourcing-data medium as a function of an induced relative movement between at least two movable sourcing-data-medium transfer heads and the sourcing data medium comprises:
    means for inducing a relative movement between the at least two stationary sourcing-data-medium transfer heads and the sourcing-data medium;
    means for reading the first portion of data from the sourcing-data medium utilizing the at least two stationary sourcing-data-medium transfer heads;
    means for inducing a relative movement between the at least two movable sourcing-data-medium transfer heads and the sourcing-data medium; and
    means for reading the second portion of data from the sourcing-data medium utilizing the at least two movable sourcing-data-medium transfer heads.

3. The system of claim 2, wherein at least one of said means for inducing a relative movement between the at least two stationary sourcing-data-medium transfer heads and the sourcing-data medium or said means for inducing a relative movement between the at least two movable sourcing-data-medium transfer heads and the sourcing-data medium comprises:
    means for moving the sourcing-data medium relative to the at least two stationary sourcing-data-medium transfer heads; and
    means for moving the at least two movable sourcing-data-medium transfer heads relative to the sourcing-data medium.

4. The system of claim 2, wherein at least one of said means for inducing a relative movement between the at least two stationary sourcing-data-medium transfer heads and the sourcing-data medium or said means for inducing a relative movement between the at least two movable sourcing-data-medium transfer heads and the sourcing-data medium comprises:
    means for constraining the relative movement between the at least two stationary sourcing-data-medium transfer heads and the sourcing-data medium as a function of data to be read in the first portion; and
    means for constraining the relative movement between the at least two movable sourcing-data-medium transfer heads and the sourcing-data medium as a function of data to be read in the second portion.

5. The system of claim 2, wherein at least one of said means for reading the first portion of data from the sourcing-data medium utilizing the at least two stationary sourcing-data-medium transfer heads or said means for reading the second portion of data from the sourcing-data medium utilizing the at least two movable sourcing-data-medium transfer heads comprises:
    means for reading the first portion of data from the sourcing-data medium utilizing the at least two stationary sourcing-data-medium transfer heads in response to a relative movement calculated to be a substantially minimal relative movement sufficient to allow said reading of the first portion of data from the sourcing-data medium by the at least two stationary sourcing-data-medium transfer heads; and
    means for reading the second portion of data from the sourcing-data medium utilizing the at least two movable sourcing-data-medium transfer heads in response to a relative movement calculated to be a substantially minimal relative movement sufficient to allow said reading of the second portion of data from the sourcing-data medium by the at least two movable sourcing-data-medium transfer heads.

6. The system of claim 5, wherein said means for reading the second portion of data from the sourcing-data medium utilizing the at least two movable sourcing-data-medium transfer heads in response to a relative movement calculated to be a substantially minimal relative movement sufficient to allow said reading of the second portion of data from the sourcing-data medium by the at least two movable sourcing-data-medium transfer heads comprises:
    means for reading the second portion of data from the sourcing-data medium utilizing the at least two movable sourcing-data-medium transfer heads in response to the relative movement sufficient to allow the at least two movable sourcing-data-medium transfer heads to do substantially a one-time sweep of an area sufficient to allow said reading of the data from the sourcing-data medium by the at least two movable sourcing-data-medium transfer heads.

7. The system of claim 5, wherein said means for reading the first portion of data from the sourcing-data medium utilizing the at least two stationary sourcing-data-medium transfer heads in response to a relative movement calculated to be a substantially minimal relative movement sufficient to allow said reading of the first portion of data from the sourcing-data medium by the at least two stationary sourcing-data-medium transfer heads and said means for reading the second portion of data from the sourcing-data medium utilizing the at least two movable sourcing-data-medium transfer heads in response to a relative movement calculated to be a substantially minimal relative movement sufficient to allow said reading of the second portion of data from the sourcing-data medium by the at least two movable sourcing-data-medium transfer heads comprise:

means for reading the first portion of data from the sourcing-data medium utilizing a number of stationary sourcing-data-medium transfer heads sufficient to span a number of tracks of a rotatable medium; and means for reading the second portion of data from the sourcing-data medium utilizing a number of movable sourcing-data-medium transfer heads sufficient to span a number of tracks of the rotatable medium.

8. The system of claim 1, wherein said means for writing the first portion of data read from the sourcing-data medium to at least one sinking-data medium as a function of an induced relative movement between at least two stationary sinking-data-medium transfer heads and the at least one sinking-data medium and said means for writing the second portion of data read from the sourcing data medium to the at least one sinking data medium as a function of an induced relative movement between at least two movable sinking-data-medium transfer heads and the at least one sinking data medium comprise:

means for inducing the relative movement between the at least two stationary sinking-data-medium transfer heads and at least one sinking-data medium;

means for writing the first portion of data read from the sourcing-data medium to the at least one sinking-data medium utilizing the at least two stationary sinking-data-medium transfer heads;

means for inducing the relative movement between the at least two movable sinking-data-medium transfer heads and the at least one sinking-data medium; and means for writing the second portion of data read from the sourcing-data medium to the at least one sinking-data medium utilizing the at least two movable sinking-data-medium transfer heads.

9. The system of claim 8, wherein at least one of said means for inducing the relative movement between the at least two stationary sinking-data-medium transfer heads and at least one sinking-data medium or said means for inducing the relative movement between the at least two movable sinking-data-medium transfer heads and the at least one sinking-data medium comprises:

means for moving the at least one sinking-data medium relative to the at least two stationary sinking-data-medium transfer heads; and means for moving the at least two movable sinking-data-medium transfer heads relative to the at least one sinking-data medium.

10. The system of claim 8, wherein at least one of said means for inducing the relative movement between the at least two stationary sinking-data-medium transfer heads and at least one sinking-data medium or said means for inducing the relative movement between the at least two movable sinking-data-medium transfer heads and the at least one sinking-data medium comprise:

means for constraining the relative movement between the at least two stationary sinking-data-medium transfer heads and the at least one sinking-data medium as a function of data to be written; and means for constraining the relative movement between the at least two movable sinking-data-medium transfer heads and the at least one sinking-data medium as a function of data to be written.

11. The system of claim 8, wherein at least one of said means for writing the first portion of data read from the sourcing-data medium to the at least one sinking-data medium utilizing the at least two stationary sinking-data-medium transfer heads or said means for writing the second portion of data read from the sourcing-data medium to the at least one sinking-data medium utilizing the at least two movable sinking-data-medium transfer heads comprises:

means for writing the first portion of data read from the sourcing-data medium to the at least one sinking-data medium utilizing the at least two stationary sinking-data-medium transfer heads via a relative movement calculated to be a substantially minimal relative movement sufficient to allow said writing of the data by the at least two stationary sinking-data-medium transfer heads; and means for writing the second portion of data read from the sourcing-data medium to the at least one sinking-data medium utilizing the at least two movable sinking-data-medium transfer heads via a relative movement calculated to be a substantially minimal relative movement sufficient to allow said writing of the data by the at least two movable sinking-data-medium transfer heads.

12. The system of claim 11, wherein said means for writing the second portion of data read from the sourcing-data medium to the at least one sinking-data medium utilizing the at least two movable sinking-data-medium transfer heads via a relative movement calculated to be a substantially minimal relative movement sufficient to allow said writing of the data by the at least two movable sinking-data-medium transfer heads comprises:

means for writing the second portion of data read from the sourcing-data medium to the at least one sinking-data medium utilizing the at least two movable sinking-data-medium transfer heads via the relative movement sufficient to allow the at least two movable sinking-data-medium transfer heads to do substantially a one-time sweep of an area sufficient to allow said writing the second portion of data read from the sourcing-data medium to the at least one sinking-data medium by the at least two movable sinking-data-medium transfer heads.

13. The system of claim 11, wherein at least one of said means for writing the first portion of data read from the sourcing-data medium to the at least one sinking-data medium utilizing the at least two stationary sinking-data-medium transfer heads via a relative movement calculated to be a substantially minimal relative movement sufficient to allow said writing of the data by the at least two stationary sinking-data-medium transfer heads or said means for writing the second portion of data read from the sourcing-data medium to the at least one sinking-data medium utilizing the at least two movable sinking-data-medium transfer heads via a relative movement calculated to be a substantially minimal relative movement sufficient to allow said writing of the data by the at least two movable sinking-data-medium transfer heads comprises:
- means for writing the first portion of data read from the sourcing-data medium to the at least one sinking-data medium utilizing a number of stationary sinking-data-medium transfer heads sufficient to span a number of tracks of a rotatable medium; and
- means for writing the second portion of data read from the sourcing-data medium to the at least one sinking-data medium utilizing a number of movable sinking-data-medium transfer heads sufficient to span a number of tracks of a rotatable medium.

14. The system of claim 1, wherein said means for writing the second portion of data read from the sourcing-data medium to at least one sinking-data medium as a function of an induced relative movement between at least two movable sinking-data-medium transfer heads and the at least one sinking-data medium comprises:
- means for writing the second portion of data read from the sourcing-data medium to a first data medium as a function of an induced relative movement between at least two first movable data-medium transfer heads and the first data medium; and
- means for writing the second portion of data read from the sourcing-data medium to a second data medium as a function of an induced relative movement between at least two second movable data-medium transfer heads and the second data medium.

15. The system of claim 1, wherein said means for writing the second portion of data read from the sourcing-data medium to at least one sinking-data medium as a function of an induced relative movement between at least two movable sinking-data-medium transfer heads and the at least one sinking-data medium comprises:
- means for writing the second portion of data read from the sourcing-data medium to a first data medium used exclusively for the data read from the sourcing-data medium as a function of an induced relative movement between at least two first movable data-medium transfer heads and the first data medium; and
- means for writing the second portion of data read from the sourcing-data medium to a second data medium used exclusively for the data read from the sourcing-data medium as a function of an induced relative movement between at least two second movable data-medium transfer heads and the second data medium.

16. The system of claim 1 wherein at least one array of the one or more arrays of sourcing-data-medium transfer heads, the one or more arrays of stationary sinking-data-medium transfer heads, the one or more arrays of movable sourcing-data-medium transfer heads, or the one or more arrays of movable sinking-data-medium transfer heads includes a two-dimensional array of data-medium transfer heads.

17. A system comprising:
- a sourcing data medium and a sinking data medium;
- at least one rotatable data storage device comprising the sourcing data medium and the sinking data medium;
- at least one stationary sourcing-data-medium transfer head, of an array of stationary sourcing-data-medium transfer heads, configured to read a first portion of data from the sourcing data medium as a function of an induced relative movement between the array of stationary sourcing-data-medium transfer heads and the sourcing data medium;
- at least one stationary sinking-data-medium transfer head, of an array of stationary sinking-data-medium transfer heads, configured to write the first portion of data from the data sourcing medium to the data sinking medium as a function of an induced relative movement between the array of stationary sinking-data-medium transfer heads and the sinking data medium;
- at least one movable sourcing-data-medium transfer head, of an array of movable sourcing-data-medium transfer heads, configured to read a second portion of data from the sourcing data medium as a function of an induced relative movement between the array of movable sourcing-data-medium transfer heads and the sourcing data medium; and
- at least one movable sinking-data-medium transfer head, of an array of movable sinking-data-medium transfer heads, configured to write the second portion of data from the data sourcing medium to the data sinking medium as a function of an induced relative movement between the array of movable sinking-data-medium transfer heads and the sinking data medium.

18. The system of claim 17 wherein at least one array of the array of sourcing-data-medium transfer heads, the array of stationary sinking-data-medium transfer heads, the array of movable sourcing-data-medium transfer heads, or the array of movable sinking-data-medium transfer heads includes a two-dimensional array of data-medium transfer heads.

\* \* \* \* \*